US011922490B2

(12) United States Patent
Luke et al.

(10) Patent No.: US 11,922,490 B2
(45) Date of Patent: Mar. 5, 2024

(54) SYSTEMS AND METHODS FOR ASSET TRACKING USING AN AD-HOC MESH NETWORK OF MOBILE DEVICES

(71) Applicant: Gogoro Inc., Hong Kong (CN)

(72) Inventors: Hok-Sum Horace Luke, Mercer Island, WA (US); Matthew Whiting Taylor, North Bend, WA (US)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 15/912,392

(22) Filed: Mar. 5, 2018

(65) Prior Publication Data

US 2018/0261063 A1 Sep. 13, 2018

Related U.S. Application Data

(63) Continuation of application No. 14/965,569, filed on Dec. 10, 2015, now Pat. No. 9,911,296.
(Continued)

(51) Int. Cl.
*G08B 13/24* (2006.01)
*G06Q 10/08* (2023.01)
(Continued)

(52) U.S. Cl.
CPC ......... *G06Q 30/0645* (2013.01); *G06Q 10/08* (2013.01); *G06Q 10/0833* (2013.01);
(Continued)

(58) Field of Classification Search
CPC ............... G06Q 30/0645; G06Q 10/08; G06Q 10/0833; G06Q 10/20; G06Q 50/28;
(Continued)

(56) References Cited

U.S. PATENT DOCUMENTS 6,738,628 B1 5/2004 McCall et al.
6,975,222 B2 12/2005 Krishan et al.
(Continued)

FOREIGN PATENT DOCUMENTS

CN 107636700 1/2018
EP 3231228 12/2017
(Continued)

OTHER PUBLICATIONS

International Search Report and Written Opinion dated Apr. 18, 2016 for corresponding International Application No. PCT/US2015/065053, 10 pages.
(Continued)

*Primary Examiner* — An T Nguyen
(74) *Attorney, Agent, or Firm* — Perkins Coie LLP (57) ABSTRACT

An asset includes a short range transmitter that broadcasts a first signal that includes a unique identifier associated with the asset. Each asset is carried by one of number of mobile devices, and each asset is freely exchangeable between any of the number of mobile devices. Each of at least some of the mobile devices carries a receiver to receive the first signals within reception range of the receiver. Each of at least some of the mobile devices aggregates the received unique identifiers. Each of at least some of the mobile devices carries a transmitter that transmits a second signal that includes data representative of a geolocation of the respective mobile device and data indicative of the unique identifiers received by the respective mobile device to a back-end system. The back-end system uses the data included in the received second signals to track and locate assets within a geographic area.

21 Claims, 6 Drawing Sheets

Related U.S. Application Data (60) Provisional application No. 62/090,240, filed on Dec. 10, 2014.

(51) Int. Cl.
   *G06Q 10/0833* (2023.01)
   *G06Q 10/20* (2023.01)
   *G06Q 30/0645* (2023.01)
   *G06Q 50/28* (2012.01)
   *H04W 4/029* (2018.01)
   *G08B 21/02* (2006.01)

(52) U.S. Cl.
   CPC ............. *G06Q 10/20* (2013.01); *G06Q 50/28* (2013.01); *H04W 4/029* (2018.02); *G08B 21/0227* (2013.01); *G08B 21/0269* (2013.01); *G08B 21/0272* (2013.01)

(58) Field of Classification Search
   CPC .... H04W 4/029; H04W 4/02; G08B 21/0227; G08B 21/0269; G08B 21/0272; Y02T 10/70; Y02T 10/7072
   See application file for complete search history.

(56) References Cited

U.S. PATENT DOCUMENTS

| | | | |
|---|---|---|---|
| 7,567,166 B2 | 7/2009 | Bourgine De Meder | |
| 7,672,677 B2 | 3/2010 | Howard et al. | |
| 8,026,814 B1 | 9/2011 | Heinze et al. | |
| 8,618,915 B2* | 12/2013 | Miller | H04M 1/0262 340/10.4 |
| 9,613,099 B2 | 4/2017 | Molloy | |
| 9,911,296 B2 | 3/2018 | Luke et al. | |
| 2003/0225707 A1 | 12/2003 | Ehrman | |
| 2006/0025154 A1 | 2/2006 | Alapuranen et al. | |
| 2007/0001854 A1* | 1/2007 | Chung | G08B 13/02 340/572.1 |
| 2007/0008141 A1* | 1/2007 | Sweetland | H01M 10/42 340/572.7 |
| 2008/0039979 A1 | 2/2008 | Bridges | |
| 2008/0040263 A1 | 2/2008 | Pollack | |
| 2008/0040295 A1 | 2/2008 | Kaplan | |
| 2008/0040296 A1 | 2/2008 | Bridges | |
| 2009/0259573 A1 | 10/2009 | Cheng et al. | |
| 2010/0010698 A1 | 1/2010 | Iwashita | |
| 2010/0094496 A1 | 4/2010 | Hershkovitz | |
| 2010/0161165 A1 | 6/2010 | Basir | |
| 2010/0237985 A1 | 9/2010 | Landau-Holdsworth | |
| 2011/0050424 A1 | 3/2011 | Cova et al. | |
| 2012/0005031 A1 | 1/2012 | Jammer | |
| 2012/0109798 A1 | 5/2012 | Shelton | |
| 2013/0030608 A1* | 1/2013 | Taylor | H02J 7/0013 701/2 |
| 2013/0030696 A1 | 1/2013 | Wu | |
| 2013/0060396 A1 | 3/2013 | Tomlinson | |
| 2013/0109375 A1* | 5/2013 | Zeiler | H04W 12/126 455/552.1 |
| 2013/0181838 A1 | 7/2013 | Luke | |
| 2014/0125501 A1 | 5/2014 | Baade | |
| 2014/0134468 A1* | 5/2014 | Schaefer | H01M 10/425 429/90 |
| 2014/0330685 A1 | 11/2014 | Nazzari | |
| 2015/0095255 A1 | 4/2015 | Hall | |
| 2015/0127479 A1 | 5/2015 | Penilla | |
| 2015/0306967 A1 | 10/2015 | Cohen | |
| 2015/0318583 A1* | 11/2015 | Bacquet | H04B 3/548 324/426 |
| 2015/0345977 A1 | 12/2015 | Saito | |
| 2016/0057565 A1 | 2/2016 | Gold | |
| 2016/0171855 A1 | 6/2016 | Luke et al. | |
| 2016/0285516 A1 | 9/2016 | Toya | |

FOREIGN PATENT DOCUMENTS

| | | |
|---|---|---|
| JP | 2008-143658 | 6/2008 |
| JP | 2011-065498 | 3/2011 |
| JP | 2013-207923 | 3/2012 |
| JP | 2018504873 | 2/2018 |
| TW | 201628388 | 8/2016 |
| WO | 2007/057895 | 5/2007 |
| WO | 2013063507 A1 | 5/2013 |
| WO | 2016/094696 | 6/2016 |

OTHER PUBLICATIONS

Summons to attend Oral Proceedings received for European Patent Application No. 15867371.5; Applicant: Gogoro Inc., Date of Mailing Apr. 25, 2019, 9 pages.

* cited by examiner

TABLE 1) SECOND SIGNAL CONTENT

| SECOND SIGNALS | GEOLOCATION | ASSET 1 | | ASSET 2 | | ASSET 3 | ASSET 4 | | ASSET 5 |
|---|---|---|---|---|---|---|---|---|---|
| 108a | 104a | 106a | + | $106b_1$ | + | $106b_2$ | --- | | --- |
| 108b | --- | --- | | --- | | --- | --- | | --- |
| 108c | 104c | 106c | + | $106b_1$ | + | $106b_2$ | $106d_1$ | + | $106d_2$ |
| 108d | 104d | $106d_1$ | + | $106d_2$ | + | 106e | --- | | --- |

SYSTEMS AND METHODS FOR ASSET TRACKING USING AN AD-HOC MESH NETWORK OF MOBILE DEVICES

CROSS-REFERENCE TO RELATED APPLICATIONS

This application is a continuation of U.S. application Ser. No. 14/965,569, filed Dec. 10, 2015 (U.S. Pat. No. 9,911,296), which claims priority to U.S. Provisional Application No. 62/090,240, filed Dec. 10, 2014, both of which are incorporated by reference herein in their entireties.

BACKGROUND

Technical Field

The present disclosure generally relates to the tracking of assets using a dynamic, ah-hoc mesh network.

Description of the Related Art

Assets take many forms. In a typical asset tracking system, identifiers carried by each asset to be tracked are periodically or continuously read using a fixed infrastructure, for example using terrestrial based communication networks (e.g., cellular communication networks) or non-terrestrial based communication networks (e.g., satellites). Terrestrial networks are often limited in geographic extent and are sometimes unable to track assets that may be disposed in remote locations or other areas where the terrestrial network has inadequate or incomplete coverage. Expanding terrestrial networks is often time consuming and expensive due to the myriad of federal, state, and local regulations covering the installation of network components such as cellular towers. Non-terrestrial networks offer broader coverage, but require significantly greater coverage is possible, however costs for both infrastructure and bandwidth are significantly greater than for terrestrial networks.

BRIEF SUMMARY

An environmentally-friendly transportation infrastructure can include a number of vehicle technologies including electric (e.g., battery powered) and hybrid-electric (e.g., gasoline-electric hybrids) vehicles. While the environmental benefits of electric vehicles outweigh those of hybrids, widespread acceptance of electrically powered or battery powered vehicles has been hindered by the perceived difficulty in charging the secondary storage devices that power such vehicles. Exchanging of depleted or discharged electric energy storage devices for charged electric energy storage devices—such portable electric energy storage devices permit rapid exchange and minimize the vehicular downtime. However, by nature of their portability, such portable electric energy storage devices are susceptible to misplacement, misappropriation, or theft.

The provision of portable electric energy storage devices for use in electrically powered vehicles may take the form of a service provided by either the vehicle manufacturer or a separate entity using charging and distribution stations dispersed about a geographic area. One such model envisions the provision of portable electric energy storage devices to customers as a service where customers are able to select plans according to their driving habits and needs. In such instances, making a large number of portable electric energy storage devices available to customers in a public environment increases the need for locating lost or stolen portable electric energy storage devices.

Providing a tracking system capable of locating lost or stolen portable electric energy storage devices can reduce the incidence of theft and assist in locating lost or wayward portable electric energy storage devices. With substantial numbers of customers, each using an electrically powered mobile device (i.e., a vehicle such as a scooter) it is possible to establish an ad-hoc mesh network in which portable electric energy storage devices broadcast a signal containing a unique identifier. Each of the electrically powered vehicles receives signals broadcast by nearby portable electric energy storage devices. Each of the electrically powered vehicles can aggregate the signals received from nearby portable electric energy storage devices and transmit the aggregated signals (each of which contains a unique ID corresponding to a single portable electric energy storage device) along with data indicative of the geolocation of the electrically powered vehicle to one or more back-end systems. If multiple electrically powered vehicles transmit the same portable electric energy storage device identifier, the one or more back end systems can use the geolocation data to triangulate a more precise location of a particular portable electric energy storage device. Such systems and methods also permit the portable electric energy storage device supplier to locate a particular portable electric energy storage device.

Each portable electric energy storage device is equipped with a transponder. Such transponders may take the form of passive devices, active devices, or combinations thereof. Where passive transponders are used, some or all of the electrically powered vehicles may carry an interrogator or similar device that causes nearby passive transponders to broadcast data indicative of the unique identifier assigned to the portable electric energy storage device. Where active transponders are used, some or all of the electrically powered vehicles may carry a receiver tuned to the transmission frequency of the active transponders. Such active transponders may be powered using a dedicated power cell or using a small quantity of energy provided by the portable electric energy storage device itself.

An asset tracking system may be summarized as including: a plurality of assets to be tracked, each of the assets having a unique identifier associated therewith and an active transmitter that broadcasts a first signal including data representative of the respective unique identifier assigned to the respective asset; a plurality of mobile devices, each of the mobile devices capable of carrying at least one of the plurality of assets; wherein each of the plurality of assets is freely exchangeable between at least two of the plurality of mobile devices; wherein each of at least a number of the plurality of mobile devices includes a receiver to receive and an aggregator to aggregate a number of first signals broadcast by each of a respective number of assets; and wherein each of the number of the plurality of mobile devices transmits a respective second signal that includes data representative of a geolocation of the respective mobile device and data representative of the aggregated number of first signals received by the respective mobile device from each of the respective number of assets.

The asset tracking system may further include: a back-end system including at least one communications interface to receive the second signal broadcast by each of the number of the plurality of mobile devices; at least one processor communicably coupled to the at least one communications interface; and a nontransitory storage media communicably coupled to the at least one processor, the nontransitory storage media including instructions that, when executed by the at least one processor, cause the at least one processor to: determine a location of each of at least some of the plurality of assets using a number of second signals, each transmitted by a respective one of the number of mobile devices, the location of each of at least some of the plurality of assets determined based at least in part on data representative of the geolocation information and the data representative of the aggregated number of first signals in each of the number of received second signals. The instructions may further cause the at least one processor to: receive, via an input device communicably coupled to the back end system, a unique identifier associated with a particular asset; communicate a signal that polls a number of mobile devices, causing each of the number of mobile devices to broadcast a second signal that includes data representative of the geolocation of the respective mobile device and data representative of the aggregated number of first signals received by the respective mobile device from each of the respective number of assets; and determine a geographic area in which the particular asset is physically present. The instructions may further cause the at least one processor to: receive, via an input device communicably coupled to the back end system, a unique identifier associated with a particular asset; and determine a location of the particular asset using the number of received second signals and based at least in part on data representative of the geolocation information and the data representative of the aggregated number of first signals in each of the number of received second signals. Each of the plurality of assets may include a portable electrical energy storage device. The plurality of mobile devices may include a plurality of electrically driven vehicles using at least one portable electrical energy storage device to provide energy to at least one electric motor. Each of the number of the plurality of mobile devices may aggregate, from time-to-time, the number of first signals broadcast by each of the respective number of assets; and wherein each of the plurality of mobile devices may transmit a respective second signal that includes data representative of a geolocation of the respective mobile device and data representative of the aggregated number of first signals received by the respective mobile device from each of the respective number of assets only when a new first signal is detected by the at least one controller. Each of the number of the plurality of mobile devices may aggregate, from time-to-time, the number of first signals broadcast by each of the respective number of assets; and wherein each of the plurality of mobile devices may transmit a respective second signal that includes data representative of a geolocation of the respective mobile device and data representative of the aggregated number of first signals received by the respective mobile device from each of the respective number of assets only when a loss of an existing first signal is detected by the at least one controller.

An asset tracking method may be summarized as including: receiving a number of first signals at each of a number of receivers physically coupled to a respective number of mobile devices, each of the first signals broadcast by a respective one of a plurality of active transmitters that are physically coupled to a respective one of a plurality of assets, each of the first signals including data representative a unique asset identifier; aggregating each of the unique asset identifiers included in each of the received number of first signals by at least one controller physically coupled to each of the number of mobile devices and communicably coupled to each of the number of receivers; transmitting a second signal by each of the number of mobile devices, each of the second signals including data representative of a geolocation of the respective mobile device and data indicative of the aggregated unique asset identifiers received as a first signal by the mobile device.

The asset tracking method may further include: receiving at a back end system, the number of second signals; and determining by the back end system a geographic area in which each of the plurality of assets is located using the data representative of the geolocation of each of the number of mobile devices included in each of the number of received second signals and the data representative of the aggregated unique asset identifiers received by each of the number of mobile devices in each of the number of received second signals. Broadcasting a second signal by each of the number of mobile devices may include: transmitting a second signal by each of the number of mobile devices only when a new first signal is detected by the at least one controller physically coupled to the respective mobile device. Broadcasting a second signal by each of the number of mobile devices may include: transmitting a second signal by each of the number of mobile devices only when a loss of a first signal is detected by the at least one controller physically coupled to the respective mobile device. The asset tracking method may further include: receiving, via an input device communicably coupled to the back end system, data representative of a unique identifier associated with a particular asset; transmitting a signal, by the back end system, that polls a number of mobile devices, causing each of the number of mobile devices to broadcast a second signal that includes data representative of the geolocation of the respective mobile device and data representative of the aggregated number of first signals received by the respective mobile device from each of the respective number of assets; and determining, by the back end system, a geographic area in which the particular asset is physically present. The asset tracking method may further include: receiving, via an input device communicably coupled to the back end system, data representative of a unique identifier associated with a particular asset; and determining, by the back end system, a location of the particular asset using the number of received second signals and based at least in part on data representative of the geolocation information and the data representative of the aggregated number of first signals in each of the number of received second signals.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electric energy storage device distribution; communications technologies and/or protocols; energy storage devices such as batteries, supercapacitors or ultracapacitors; power converters including but not limited to transformers, rectifiers, DC/DC power converters, switch mode power converters; design and structure of vehicle components; wireless communications protocols; controllers, and communications systems and structures and networks have not been shown or described in detail to avoid unnecessarily obscuring descriptions of the embodiments.

As used herein, "portable electric energy storage device" or a reference to one or more "portable electric energy storage devices" can refer to any type of current or future developed secondary electrical energy storage device, such as lithium ion, nickel/cadmium, lead/acid, nickel/metal hydride, supercapacitors, ultracapacitors, and the like.

As used herein "short range transponder" refers to any device capable of broadcasting a signal that contains, includes, and/or carries data. Such short range transponders can be passive devices that require the delivery of activating energy from an external device to transmit a signal containing, including, or carrying unique identification data (e.g., a passive radio frequency ID or "RFID" transponder requiring activation energy supplied by an external RF source). Such short range transponders can include active devices that use a power supply such as a battery to broadcast a signal containing, including, or carrying unique identification data (e.g., an active RFID transponder coupled to a stored energy device such as a battery). A short range transponder can use any current or future developed communication technology including, but not limited to, RFID, near-field communications (NFC), BLUETOOTH®, and the like.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

Figures 1A, 1B:
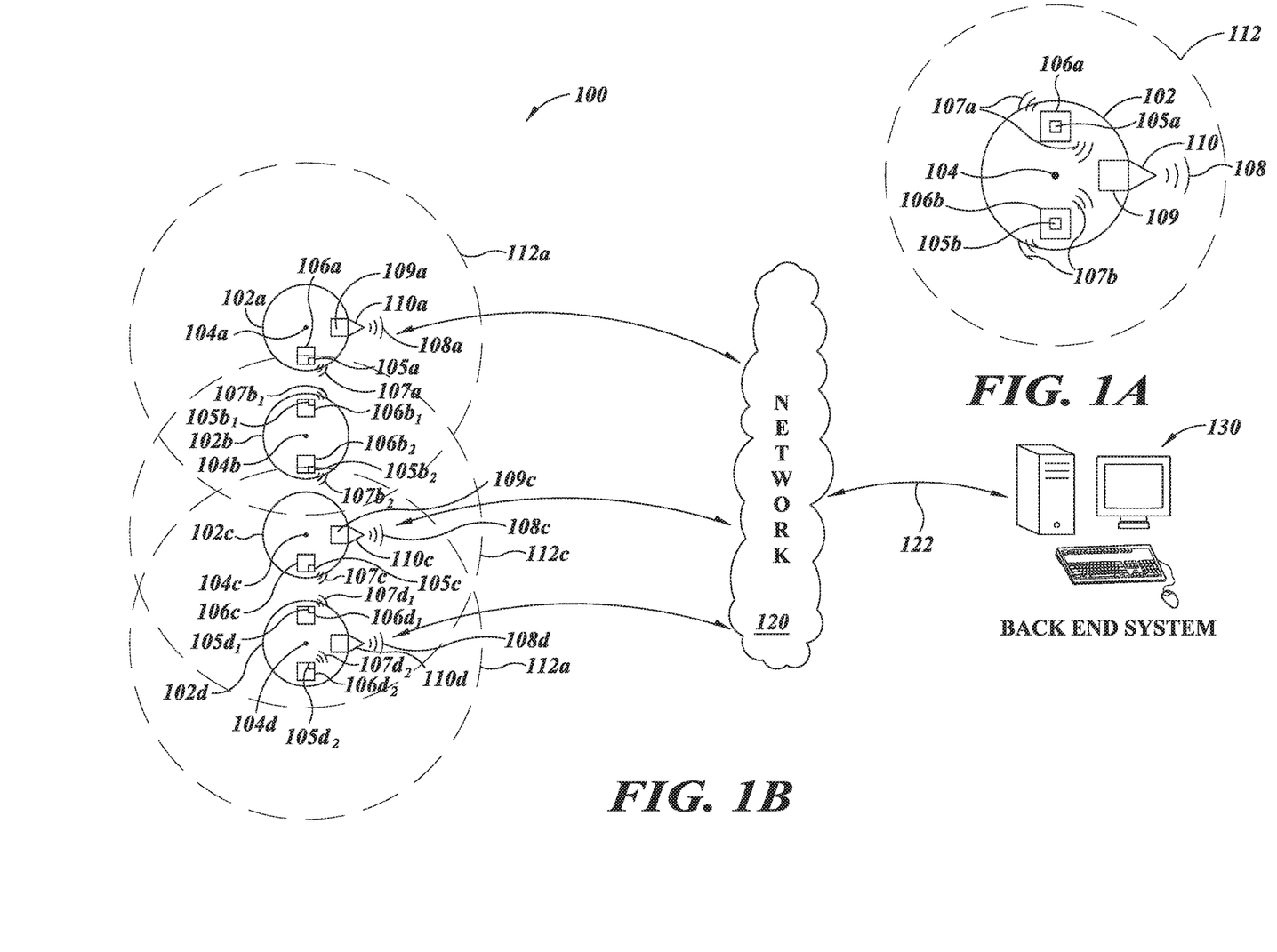
FIG. 1A is a block diagram of an example mobile device that carries two assets and is equipped with a geolocation device, a receiver, and a transmitter, according to an illustrated embodiment.
FIG. 1B is a schematic network diagram showing an example asset tracking system that uses an ad-hoc mesh network of mobile devices such as those shown in FIG. 1A to report geolocation data and identification data unique to nearby assets, according to one illustrated embodiment.

FIG. 1A shows an illustrative mobile device 102 positioned at geolocation 104 and carrying two assets 106a and 106b, each of which includes a respective short range transponder 105a and 105b, according to an embodiment. The mobile devices 102 include, but are not limited to motor-driven vehicles powered in whole or in part using one or more portable electric energy storage devices. Non-limiting examples can include electrically powered bicycles, electrically powered motorcycles, electrically powered scooters, and electrically powered automobiles and trucks. In some implementations, each mobile device 102 carries at least one asset 106, for example one or more electrically powered scooters 102 (i.e., mobile devices) carries one or more portable electric energy storage devices 106 (i.e., assets) that provide energy to a prime mover that provides a shaft output to drive the electrically powered scooter.

In some implementations, at least some of the assets 106 may be owned by a first entity (e.g., portable energy storage devices owned by a rental or leasing company) and at least some of the mobile devices 102 may be owned by a second entity that is different from the first entity (e.g., an electrically powered vehicle that is owned by a different leasing or rental company or owned directly by the consumer/operator of the electrically powered vehicle).

In general, the number of assets 106 will exceed, at times by a large margin, the number of mobile devices 102 such that, at any given time, not every asset 106 is operably coupled to a mobile device 102. For example, if the asset 106 is represented by a portable energy storage device 106 and the mobile device is represented by an electrically powered vehicle 102, a sufficient number of charged portable energy storage devices 106 should be available to provide at least a portion of the population of electrically powered vehicles 102 a replacement portable energy storage device 106 upon return of a number of discharged portable energy storage devices 106. In such instances, the value of the mobile devices 102 carrying the assets 106 may exceed the value of the assets 106.

At times, the population density of portable energy storage devices 106 (e.g., number of portable energy storage devices 106 per a defined unit area) can be greater than the population density of electrically powered vehicles 102 (e.g., number of electrically powered vehicles 102 per defined unit area). At other times, the population density of electrically powered vehicles 102 can be greater than the population of portable energy storage devices 106. The population density of assets 106 (e.g., portable energy storage devices 106) may be 1 or more per 1000 square meters ($m^2$); 5 or more per 1000 $m^2$; 5 or more per 1000 $m^2$; 10 or more per 1000 $m^2$; 50 or more per 1000 $m^2$; 100 or more per 1000 $m^2$; 500 or more per 1000 $m^2$; or 1000 or more per 1000 $m^2$. The population density of mobile devices 102 (e.g., electrically powered vehicles 102) may be 1 or more per 1000 square meters ($m^2$); 5 or more per 1000 $m^2$; 5 or more per 1000 $m^2$; 10 or more per 1000 $m^2$; 25 or more per 1000 $m^2$; 50 or more per 1000 $m^2$; 100 or more per 250 $m^2$; or 500 or more per 1000 $m^2$.

Each mobile device 102 is positioned at a geolocation 104 that can be determined using any current or future developed geolocation technology. For example, some or all of the mobile devices 102 can include a global positioning system ("GPS") receiver capable of providing data indicative of the geolocation 104 the respective mobile device 102. At times, such geolocation data 104 can be directly communicated from the on-board geolocation device to the transmitter 110. At other times, the geolocation data 104 can be indirectly communicated from the on-board geolocation device to the transmitter 110, for example via one or more vehicular buses to one or more vehicular controllers that are communicably coupled to the transmitter 110.

The mobile device 102 carries two assets 106a and 106b (collectively "assets 106"). Each of the assets 106 can include one or more components that are freely exchangeable (i.e., can be used interchangeably) between some or all of a population of mobile devices 102. For example, each asset 106 might include a portable energy storage device, such as a secondary battery (e.g., a lithium ion battery), that is freely exchangeable between mobile devices 102 and can be used to power each of at least a portion of a population of mobile devices 102, such as each of at least a portion of the electrically powered scooters in a population of electrically powered scooters or other similar electrically powered vehicles.

Each of the assets 106 carries a respective short range transponder 105a and 105b (collectively "short range transponders 105"). The short range transponders either autonomously or upon interrogation generate a respective first signal 107a and 107b (collectively, "first signals 107"). Each of the first signals 107 includes data indicative of a unique identifier assigned to the particular asset 106 carrying the respective short range transponder 105. At other times, the first signal 107 generated by some or all of the short range transponders 105 may include additional information such as asset specific information. For example, where the assets 106 include secondary portable energy storage device (i.e., rechargeable batteries), the first signal 107 may include charge information such as charge level, charge cycles, average rate of charge, average rate of discharge, and the like.

Although the short range transponders 105 are discussed herein in the context of a Near Field Communication or RFID device, it should be understood that the short range transponder 105 carried by some or all of the assets 106 can be replaced by a long range communication device such as a CDMA, GSM, 3G, 4G, or LTE cellular communication device. In such instances, the long range device may wiredly or wirelessly communicably couple to one or more devices carried by the asset 102 and may receive signals including operational data related to one or more functions performed by the mobile device 102. In such instances, the functionality of the long range device may replace some or all of the functionality of the receiver 109 and/or the transmitter 110. Given the relatively larger population of assets 106 in comparison to the relatively smaller population of mobile devices 102, it is financially advantageous that the short range transponder 105 coupled to the asset is inexpensive. For example, the short range transponder 105 may be a relatively inexpensive NFC or RFID transponder rather than a relatively expensive cellular transponder. For example, the asset 106 may be represented by a portable energy storage device 106 owned by a first entity and the mobile device 102 may be represented by an electrically powered vehicle 102, such as a scooter, owned by a second entity that may be different from the first owner. The portable energy storage 106 device may carry a cellular transceiver chip that is communicably coupled to a vehicle controller in the electrically powered vehicle 102. The vehicle controller 102 or one or more other vehicular systems, for example a geolocation system, may communicate operational, performance, or location data to the cellular chip carried by the portable energy storage device 106 for transmission to one or more remote devices such as a back end system operated by the first owner. The second owner may or may not be aware of the data transmission by the cellular chip and may or may not be aware of the content of the data transmission by the cellular chip.

In some implementations, the short range transponder 105 carried by the asset 106 can include a passive transponder 105 that receives energy from an external source, for example an interrogation signal. In other implementations, the short range transponder 105 carried by the asset 106 is an active transponder 105 that is either self-powered or receives power from the asset 106. The short range transponder 105 can communicate using one or more standard or proprietary communications protocols. In some implementations, the short range transponder 105 can include one more devices powered via an external power supply such as a solar cell, wind turbine or other renewable energy source.

The short range transponder 105 is physically coupled to the asset 106 in a manner that deters removal of the short range transponder 105 from the asset 106. In some instances, the short range transponder 105 is disposed inside an external case holding the asset 106. For example, the short range transponder 105 may be disposed inside the case of an asset 106 such as a lithium ion battery.

At least some of the mobile devices 102 carry a receiver 109 that receives first signals 107 generated by the short range transponder 105 in each of the assets 106 carried by the respective mobile device 102. In some implementations, the mobile device 102 (e.g., an electrically powered vehicle such as a scooter) carrying the receiver 109 and the transmitter 110 can be of considerably greater value than the asset 106 (e.g., a portable electric energy storage device such as a lithium ion battery or pack of lithium ion batteries 106 used to power the scooter 102). The receiver 109 also receives first signals 107 generated by the short range transponders 105 in assets 106 located within the detection range 112 of the receiver 109. For example, the receivers 109 carried by some or all of the mobile devices 102 may receive first signals 107 generated by short range transponders 105 within a range or radius of about 1 meter or less; about 5 meters or less; about 10 meters or less; about 25 meters or less; about 50 meters or less; about 100 meters or less, or 100 meters or more from the mobile device 102 carrying the respective receiver 109. Although described in the context of ranges of less than 100 meters, and while such shorter ranges may offer benefits in the form of power consumption, such should not be considered limited to shorter distances.

Each of at least some of the mobile devices 102 carries a transmitter 110 that generates a second signal 108 that is communicated to one or more back-end systems 130 via the one or more networks 120. Such transmitters 110 may include radio frequency (RF) transmitters, such as one or more terrestrial communication transmitters including one or more cellular telephone (GSM, CDMA, etc.) transmitters. Communication between the transmitter 110 and the one or more back-end systems 130 can be unidirectional or bidirectional. At times, the receiver 109 carried by a mobile device 102 may be directly or indirectly, wiredly (e.g., via one or more vehicle busses such as a controller area network bus or "CAN bus") or wirelessly communicably coupled to the transmitter 110. In one implementation, the receiver 109 may be indirectly communicably coupled to the transmitter 110, for example via one or more CAN buses to one or more vehicle controllers. In another implementation, the receiver 109 may be a portion of the transmitter 110 (i.e., a transceiver).

The second signal 108 provided by the transmitter 110 includes data indicative of the geolocation 104 of the mobile device 102 carrying the transmitter 110 generating the second signal 108. The second signal 108 also includes data indicative of the unique identifier contained in each first signal 107 currently being received by the receiver 109. As such, the second signal 108 provides the back end system with data indicative of the geolocation of the mobile device 102 carrying the transmitter 110 generating the respective second signal 108 and data indicative of every asset 106 that broadcast the first signal and is located within the detection range of the receiver 109 carried by the mobile device 102.

The second signal 108 can be generated and transmitted by each transmitter 110 continuously, intermittently at irregular intervals, periodically, or from time-to-time. For example, the second signal 108 can be generated and transmitted by each transmitter 110 at periodic intervals of about 15 seconds, 30 seconds, 1 minute, 3 minutes, 5 minutes, or 10 minutes. At times, the second signal 108 can be generated and transmitted by each transmitter 110 on an event driven basis, for example when a particular asset 106 enters or leaves the detection range 112 of the receiver 109 carried by the respective mobile device 102. The transmitter 110 can transmit the second signal 108 in encrypted or unencrypted format. Further, the data included in the second signal 108 generated and transmitted by transmitter 110 is not limited to only geolocation and unique identifier data and can, at times, include additional information, such as received signal strength of some or all first signals 107 received at the receiver 109 carried by respective mobile device 102.

The second signals 108 are communicated to the one or more back-end systems 130 via one or more networks 120. In some instances, the transmitter 110 can aggregate a number of received first signals 107 prior to transmitting the second signal 108 to the one or more back-end systems 130. In other instances, the transmitter 110 can transmit a second signal 108 containing the geolocation of the respective mobile device 105 and the unique identifier from a received first signal 107 upon initial receipt (or loss) of the first signal 107. For example, the transmitter 110 can generate and transmit a second signal 108 every time a first signal 107 containing a new unique identifier is received at (or lost by) the receiver 109 carried by the respective mobile device 102.

Advantageously, an ad-hoc mesh network is formed when the detection ranges of the receivers 109 carried a plurality of mobile devices 102 overlap. In such instances, the unique identifiers associated with assets 106 located in regions of detection range overlap will appear in two or more RF signals 108 received by the back-end system 130. By analyzing the RF signals 108 received from each mobile device 102, the one or more back-end systems 130 are able to ascertain the geolocation of each asset 106. Such beneficially provides the back-end system user with the capability to track the movement of assets 106 within an area and also provides the ability to locate lost or misappropriated assets 106 in an area even if the assets 106 have been removed from a mobile device 102.

FIG. 1B shows an asset tracking system 100 that uses an ad-hoc mesh network of mobile devices 102a-102d (collectively "mobile devices 102") to report data unique to nearby assets 106a-106d (collectively "assets 106") that can, but does not necessarily, include portable electric energy storage devices used to power the respective mobile devices 102, according to one illustrated embodiment. Each mobile device 102a-102d is positioned at a different, respective, geolocation 104a-104d (collectively "geolocations 104"). As depicted in FIG. 1B, transmitter 110a will generate and transmit a second signal 108a that includes data indicative of the geolocation 104a of mobile device 102a along with data indicative of the unique identifiers contained in first signals 107 received by receiver 109a from each of the short range transponders 105a, $105b_1$, and $105b_2$ coupled to assets 106a (carried by the mobile device 102a carrying transmitter 110a), $106b_1$ and $106b_2$. Similarly, transmitter 110c will generate and transmit a second signal 108c that includes data indicative of the geolocation 104c of mobile device 102c along with data indicative of the unique identifiers contained in first signals 107 received by receiver 109c from each of the short range transponders 105a, $105b_1$, $105b_2$, 105c, $105d_1$, and $105d_2$ coupled to assets 106a, $106b_1$, $106b_2$, 106c, $106d_1$, and $106d_2$, respectively. Likewise, transmitter 110d will generate and transmit a second signal 108d that includes data indicative of the geolocation 104d of mobile device 102d along with data indicative of the unique identifiers contained in first signals 107 received by receiver 109d from each of short range transponders 105c, $105d_1$, and $105d_2$ coupled to assets 106c, $106d_1$, and $106d_2$, respectively.

The content of the second signals 108 transmitted by each transmitter 110 will vary with time as other short range transponders 105 and/or mobile devices 102 enter and leave the range of the receiver 109 carried by the respective mobile device 102. Advantageously, since the mobile devices 102 themselves move between geographic locations, static assets 106 (i.e., assets 106 that are not carried by other mobile devices 102) can be detected. Such an ad-hoc mesh network provides the capability of detecting and locating assets 106 that are both carried by other mobile devices 102 and assets 106 that have been removed from a mobile device 102.

Figure 1C:
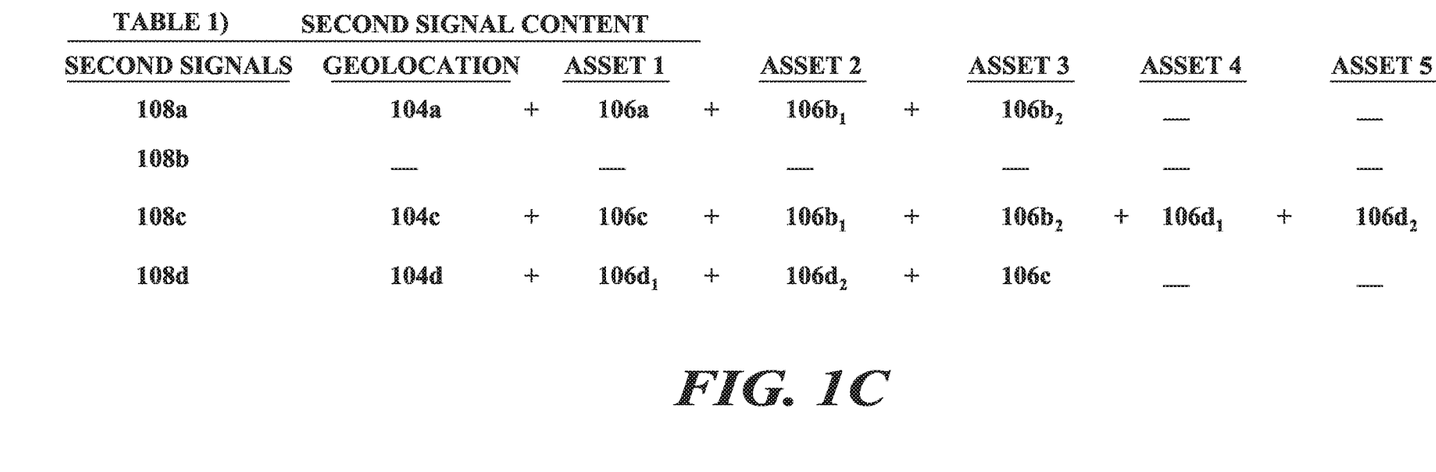
FIG. 1C is a table that shows example content of a number of second signals used in an asset tracking system, each of the number of second signals transmitted by a respective number of mobile devices to a back-end system, according to an illustrated embodiment.

FIG. 1C is a table showing example data content of second signals 108 generated and transmitted by the transmitters 110 carried by each of the mobile devices 102 depicted in FIG. 1B, according to an embodiment.

Transmitter 110a generates and transmits a second signal 108a that includes data representative of the geolocation 104a of mobile device 102a plus data indicative of the unique identifiers contained in first signals 107 received by receiver 109a and associated with assets 106a, $106b_1$, and $106b_2$. Transmitter 110c generates and transmits a second signal 108c that includes data representative of the geolocation 104c of mobile device 102c plus data indicative of the unique identifiers contained in first signals 107 received by receiver 109c and associated with assets 106a, $106b_1$, $106b_2$, 106c, $106d_1$, and $106d_2$. Transmitter 110d generates and transmits a second signal 108d that includes data representative of the geolocation 104d of mobile device 102d plus data indicative of the unique identifiers contained in first signals 107 received by receiver 109d and associated with assets 106c, $106d_1$, and $106d_2$.

Since some unique identifiers appear in more than one second signal 108, the back-end system can narrow the geolocation of the particular asset to an intersection of the receiver detection ranges 112 of the respective mobile devices 102 reporting the same unique identifier. For example, unique identifiers associated with assets $106d_1$ and $106d_2$ appear in both second signal 108c generated and transmitted by transmitter 110c carried by mobile device 102c and second signal 108d generated and transmitted by transmitter 110d carried by mobile device 102d. Additionally, the back-end system 130 may be able to further refine the location of some or all of the assets 106 based on reported signal strength of the received first signal 107 at each of the mobile devices 102.

The one or more networks 120 can include any number or combination of local area networks, wide area networks, public networks, private networks, or world-wide networks such as the Internet. The one or more networks 120 can include one or more current or future developed cellular networks (e.g., GSM, CDMA, 3G, 4G, LTE) or one or more satellite communications networks.

Figure 2:
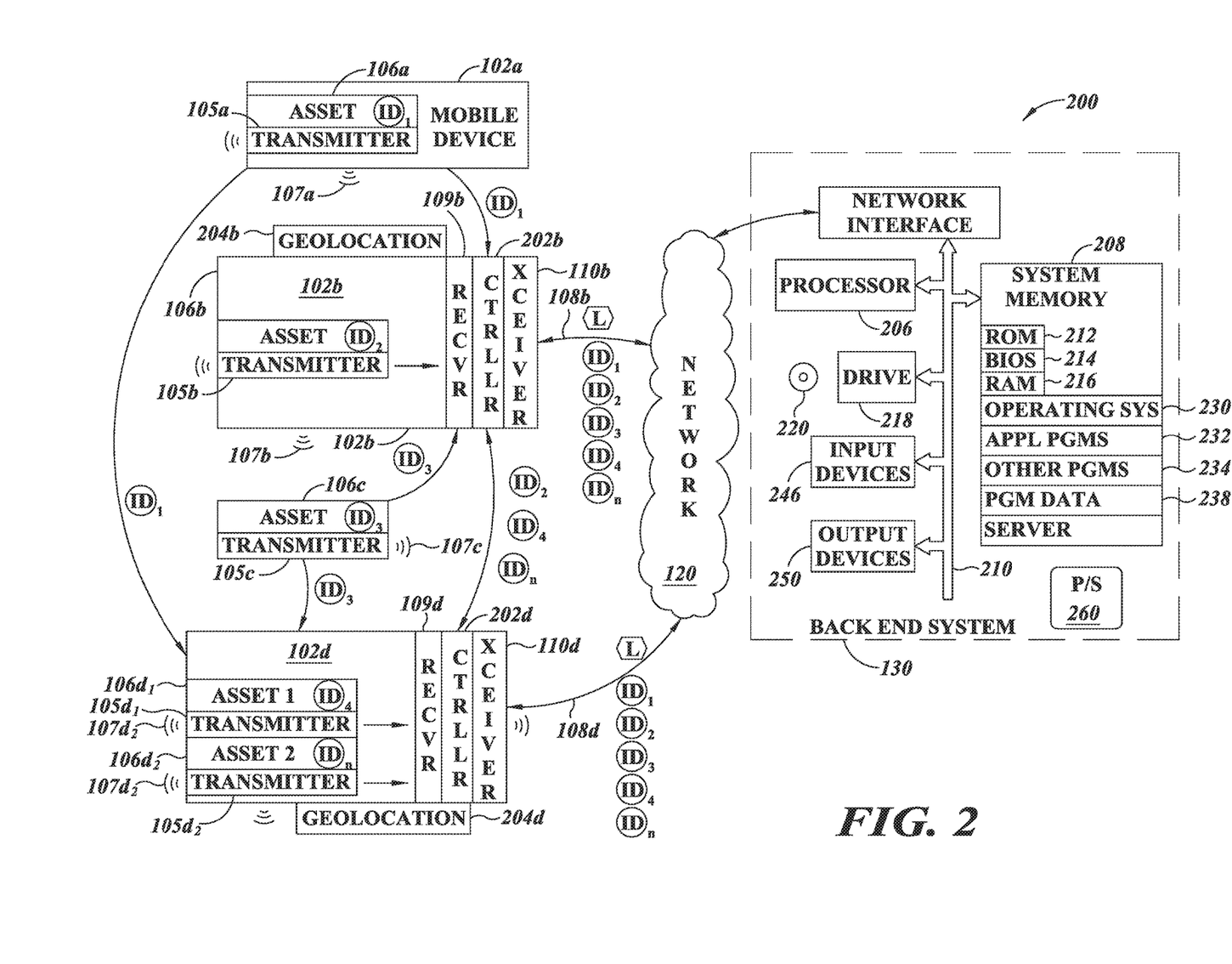
FIG. 2 is a schematic diagram view showing an asset tracking system that uses an ad-hoc mesh network of mobile devices to report data unique to nearby assets, according to one non-limiting illustrated embodiment.

FIG. 2 is a schematic diagram view showing an example asset tracking system 200 that uses an ad-hoc mesh network of mobile devices 102 to report data unique to nearby assets 106, according to one non-limiting illustrated embodiment. The system 200 includes a first mobile device 102a that includes a single asset 106, but is not equipped with a receiver 109 or transmitter 110; a second mobile device 102b that includes a single asset 106b and is equipped with a receiver 109b and a transmitter 110b; an asset 106c that is not coupled to a mobile device 102; and a third mobile device 102d that includes two assets 106d, and $106d_2$, and is equipped with a receiver and a transmitter 110. All of the assets 106 depicted in FIG. 2 fall within the respective detection range of receivers 109b and 109d. Consequently, the receivers 109 receive first signals 107 generated by each short range transponder 105a, 105b, 105c, $105d_1$, and $105d_2$. The transmitters 110b and 110d transmit second signals 108b, 108d, respectively, to the one or more back end systems 130 via the one or more networks 120.

As depicted in FIG. 2, receiver 109b receives first signals 107a, 107b, 107c, 107d, and $107d_2$ from each of the short range transponders 105a, 105b, 105c, $105d_1$, and $105d_2$, respectively. Similarly, receiver 109d receives first signals 107a, 107b, 107c, $107d_1$, and $107d_2$ from each of the short range transponders 105a, 105b, 105c, $105d_1$, and $105d_2$, respectively. In addition to receiving data indicative of the unique identifier included in each of first signals 107a, 107b, 107c, $107d_1$, and $107d_2$, some or all of the receivers 109 may collect additional information including intrinsic signal properties such as data indicative of received signal direction and received signal strength of the first signals 107.

In some implementations, each of the receivers 109b, 109d is communicably coupled to an external controller 202b, 202d, respectively. Such controllers 202 may include one or more vehicular control devices, for example a vehicular controller. In some implementations, each of the receivers 109 and/or transmitters 110 can include an internal controller 202. The controller 202 aggregates the received unique identifiers and any other intrinsic signal data from each of the receiver first signals 107, receives geolocation data for the mobile device 102 from one or more geolocation devices 204b, 204d, such as a GPS receiver, and combines the identification data, signal property data, and geolocation data for transmission as a second signal 108 by the transmitter 110.

Each of the transmitters 110b, 110d generates and transmits a respective second signal 108b, 108d to the one or more back-end systems 130. Each of the second signals 108 contains at least data indicative of the unique identifiers associated with each asset 106 received by the receiver 109 carried by the respective mobile device 102, and data representative of the geolocation of the respective mobile device 102. The back-end system 130 uses the received data to at least locate particular assets 106 and also to analyze usage parameters for each of at least some of the assets 106.

The back-end system 130 may take the form of a PC, server, or other computing system executing logic or other machine executable instructions. The back-end system 130 includes one or more processors 206, a system memory 208 and a system bus 210 that couples various system components including the system memory 208 to the processor 206. The back-end system 130 will at times be referred to in the singular herein, but this is not intended to limit the embodiments to a single system, since in certain embodiments, there will be more than one back-end system 130 or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

Although not required, some portion of the embodiments will be described in the general context of computer-executable instructions or logic and/or data, such as program application modules, objects, or macros being executed by a computer. Those skilled in the relevant art will appreciate that the illustrated embodiments as well as other embodiments can be practiced with other computer system or processor-based device configurations, including handheld devices, for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The processor 206 may be any logic processing unit, such as one or more central processing units (CPU s), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the back-end system 130, such as during start-up. Some embodiments may employ separate buses for data, instructions and power.

The system bus 210 can employ any known bus structures or architectures.

The back-end system 130 also may include one or more drives 218 for reading from and writing to one or more nontransitory computer- or processor-readable media 220 (e.g., hard disk, magnetic disk, optical disk). The drive 218 may communicate with the processor 206 via the system bus 210. The drive 218 may include interfaces or controllers (not shown) coupled between such drives and the system bus 210, as is known by those skilled in the art. The drives 218 and their associated nontransitory computer- or processor-readable media 220 provide nonvolatile storage of computer-readable instructions, data structures, program modules and other data for the back-end system 130. Those skilled in the relevant art will appreciate that other types of computer-readable media may be employed to store data accessible by a back-end system 130.

Figure 3A:
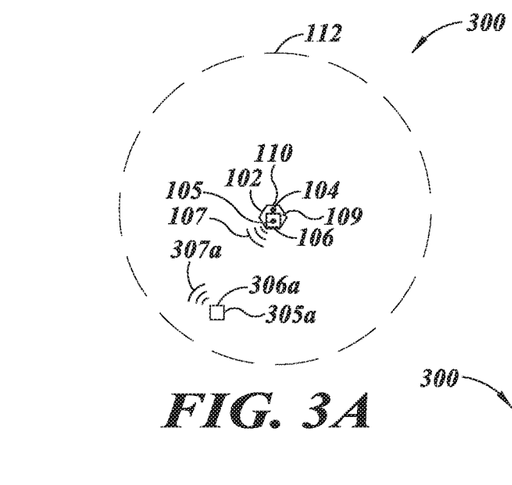
FIG. 3A is a schematic showing an asset tracking system in which only a single mobile device is available to track assets in an area, according to an illustrated embodiment.

Program modules can be stored in the system memory 208, such as an operating system 230, one or more application programs 232, other programs or modules 234, and program data 238. The application program(s) 232 may include asset location, management, and tracking functionality as described herein. For example, applications programs 232 may include one or more programs to compare received portable electric energy storage device (i.e., asset 106) identifiers with the geolocations of each of the respective reporting mobile devices 102 to determine an approximate location of each of the portable electric energy storage devices (see FIG. 3).

The application program(s) 232 may include one or more asset locating functions, for example a "be on the lookout for" or "BOLO" function where a user enters a particular unique asset identifier into the back-end system 130. Such a BOLO function can, at times, communicate a particular identifier to some or all of the mobile device controllers 202 such that immediately upon receiving a first signal 108 that includes data indicative of the particular unique identifier, the geolocation of the mobile device 102 is communicated to back-end system 130. Such is particularly useful when the transmitter 110 generates and transmits the second signal 108 on a periodic basis. Such beneficially permits system users to locate a particular asset 106 in the instance of theft or misappropriation of the particular asset 106.

The application program(s) 232 may include one or more statistical analysis functions that provide insight on asset condition, asset usage, or other asset parameters. For example, where the assets 106 include portable electric energy storage devices, the statistical analysis functions may include portable electric energy storage device charge capacity, portable electric energy storage device charge cycles, portable electric energy storage device historical locations/usage, and similar functions that enable the user to accurately predict portable electric energy storage device life cycle parameters.

The system memory 208 may include communications programs 240 that permit the back-end system 130 to access and exchange data with other networked systems or components, such as the transponders 110, the mobile devices 102, and/or other computing devices.

While shown in FIG. 2 as being stored in the system memory 208, the operating system 230, application programs 232, other programs/modules 234, program data 238 and communications 240 can be stored on the nontransitory computer- or processor-readable media 220 or other nontransitory computer- or processor-readable media.

Users can enter commands (e.g., asset location requests, asset tracking requests) and information (e.g., parameters) into the back-end system 130 using one or more communicably coupled input devices 246 such as a touch screen or keyboard, a pointing device such as a mouse, and/or a push button. Other input devices can include a microphone, joystick, game pad, tablet, scanner, biometric scanning device, etc. These and other input devices may be connected to the processing unit 206 through an interface such as a universal serial bus ("USB") interface that couples to the system bus 210, although other interfaces such as a parallel port, a game port or a wireless interface or a serial port may be used. One or more output devices 250, such as a monitor or other display device, may be coupled to the system bus 210 via a video interface, such as a video adapter. In at least some instances, the input devices 246 and the output devices 250 may be located proximate the back-end system 130, for example when the system is installed at the system user's premises. In other instances, the input devices 246 and the output devices 250 may be located remote from the back-end system 130, for example when the back-end system is hosted on a remote server system.

In some implementations, the back-end system 130 uses one or more of the logical connections to communicate with one or more mobile devices 102 (e.g., electrically powered scooters), remote computers, servers and/or other devices via one or more communications channels, for example, the one or more networks 120. These logical connections may facilitate any known method of permitting computers to communicate, such as through one or more LANs and/or WANs. Such networking environments are known in wired and wireless enterprise-wide computer networks, intranets, extranets, and the Internet.

In some implementations, a network port or interface 256, communicatively linked to the system bus 210, may be used for establishing and maintaining communications over the communications network 120.

The back-end system 130 may include an AC/DC power supply 260 that are each electrically coupled to the power distribution system 102. The AC/DC power supply 260 converts AC power from a power distribution system into DC power, which may be provided to power the various components of the back-end system 130.

In the back-end system 130, program modules, application programs, or data, or portions thereof, can be stored in one or more computing systems. Those skilled in the relevant art will recognize that the network connections shown in FIG. 2 are only some examples of ways of establishing communications between computers, and other connections may be used, including wireless. In some embodiments, program modules, application programs, or data, or portions thereof, can even be stored in other computer systems or other devices (not shown).

For convenience, the processor 206, system memory 208, network port 256 and devices 246, 250 are illustrated as communicatively coupled to each other via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

It should be appreciated that some or all of the mobile devices 102 may include components similar to those components present in the back-end system 130, including the processor 206, power supply 260, power line interface 258, buses, nontransitory computer- or processor-readable media, wired or wireless communications interfaces, and one or more input and/or output devices.

At least some of the mobile devices 102 include geolocation systems 204 such as one or more cellular triangulation and/or one or more satellite positioning receivers such as a GPS receiver, Glonass, etc. In such instances, geolocation data may be at least temporarily locally stored onboard the mobile device 102 in nontransitory computer- or processor-readable media or memory.

Some or all of the mobile devices 102 may include one or more processors and nontransitory computer- or processor-readable media or memory, for instance one or more data stores that may include nonvolatile memories such as read only memory (ROM) or FLASH memory and/or one or more volatile memories such as random access memory (RAM).

Some or all of the mobile devices 102 include one or more receivers 109 and transmitters 110, which may at times include one or more radios and associated antennas. For example, the mobile devices 102 may include one or more cellular receivers 109 and transmitters 110 for communicating with the back-end system 130 and one or more short-range receivers 109 and transmitters 110, such as WIFI® transceivers or radios, BLUETOOTH® transceivers or radios, along with associated antennas for communicating with the short range transponders 105 carried by each asset 106.

Some or all of the mobile devices 102 may include a user input/output subsystem, for example including a touchscreen or touch sensitive controls and/or display device and one or more speakers.

Some or all of the components carried by the mobile device 102 may be communicably coupled using at least one bus or similar structure adapted to transferring, transporting, or conveying data between the devices, systems, or components. The bus can include one or more serial communications links or a parallel communications link such as an 8-bit, 16-bit, 32-bit, or 64-bit data bus. In some embodiments, a redundant bus may be present to provide failover capability in the event of a failure or disruption of a primary bus.

The mobile devices 102 may include one or more controllers or processors 202 (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the one or more processor(s), a non-volatile memory may store all or a portion of a basic input/output system (BIOS), boot sequence, firmware, startup routine, and communications device operating system (e.g., iOS®, Android®, Windows® Phone, Windows® 8, Linux, Unix, and similar) executed by the one or more controllers or processors 202 upon initial application of power. The one or more controllers or processors 202 may also execute one or more sets of logic or one or more machine executable instruction sets loaded from volatile memory subsequent to the initial application of power to the one or more controllers or processors 202. The one or more controllers or processors 202 may also include a system clock, a calendar, or similar time measurement devices. One or more geolocation devices, for example a Global Positioning System (GPS) receiver 204 may be communicably coupled to the one or more controllers or processors 202 to provide additional functionality such as geolocation data to the one or more controllers or processors 202.

The receivers 109 can include any device capable of receiving communications transmitted via electromagnetic energy. Non-limiting examples of receivers 109 include a BLUETOOTH® receiver, a Near Field Communication (NFC) receiver, a Radio Frequency Identification (RFID) receiver or interrogator, or any similar current or future developed receiver having a defined reception range and providing the capability to receive first signals 107 generated by the short range transponders 105 carried by assets 106. Non-limiting examples of WIFI® short-range transceivers/receivers 109 suitable for receiving first signals 107 generated by the transponders 105 carried by each asset 106 include various chipsets available from Broadcom, including BCM43142, BCM4313, BCM94312MC, BCM4312, and chip sets available from Atmel, Marvell, or Redpine. Non-limiting examples of BLUETOOTH® short-range transceivers/receivers 109 suitable for receiving first signals 107 generated by the transponders 105 carried by each asset 106 include various chipsets available from Nordic Semiconductor, Texas Instruments, Cambridge Silicon Radio, Broadcom, and EM Microelectronic.

The transmitters or radios 110 can include any device capable of transmitting communications via electromagnetic energy. Non-limiting examples of cellular communications transceivers 110 include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the transmitters 110 can include more than one interface. For example, in some instances, the transmitters 110 can include at least one dedicated, full- or half-duplex, voice call interface and at least one dedicated data interface. In other instances, the transmitters 110 can include at least one integrated interface capable of contemporaneously accommodating both full- or half-duplex voice calls and data transfer.

Figure 3B:
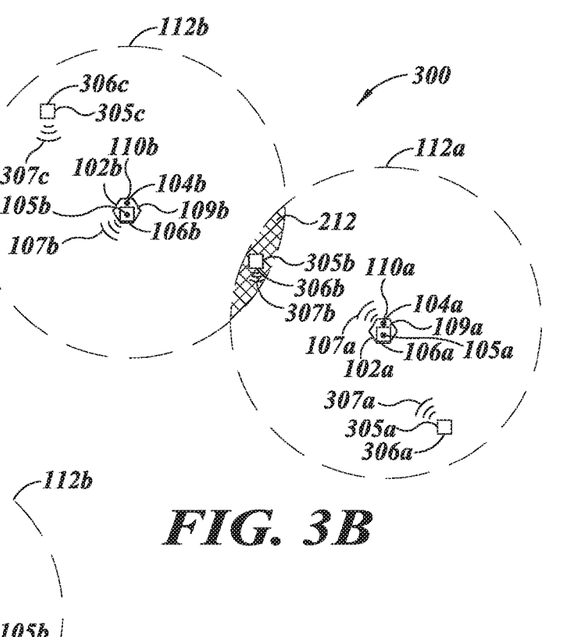
FIG. 3B is a schematic showing an asset tracking system in which two mobile devices are available to track assets in an area, according to an illustrated embodiment.
Figure 3C:
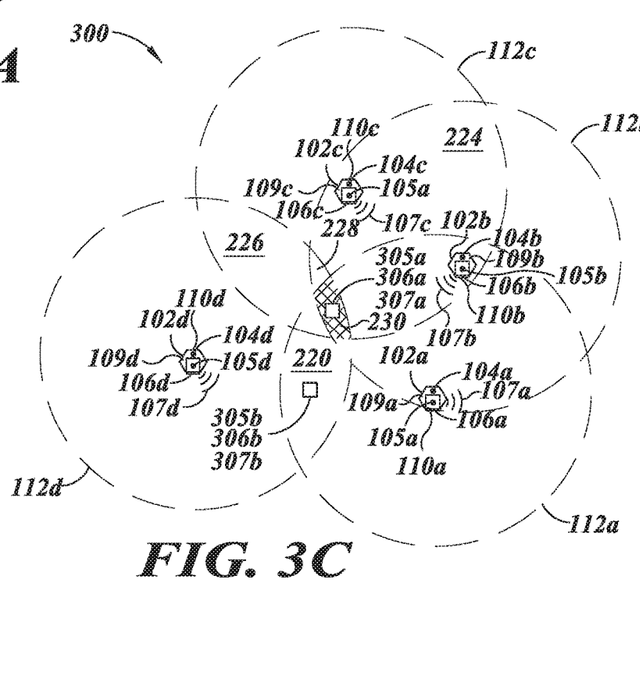
FIG. 3C is a schematic showing an asset tracking system in which four mobile devices are available to track assets in an area, according to an illustrated embodiment.

FIGS. 3A, 3B, and 3C show various scenarios in which the asset management and tracking system 100 can determine the location of assets 106 carried by mobile devices 102 and assets 306 that are not carried by mobile devices 102, according to an embodiment.

FIG. 3A depicts a single mobile device 102 positioned at geolocation 104 and carrying asset 106 (e.g., an electrically powered scooter 102, at geolocation 104, carrying a single portable electric energy storage device 106). Asset 306a carries transponder 305a and is positioned within the detection range of receiver 109 carried by mobile device 102. Transponder 305a generates a first signal 307a that includes data indicative of the unique identifier assigned to transponder 305a. Additionally, transponder 105 carried by asset 106 generates a first signal 107 that is detected by receiver 109 carried by mobile device 102. A controller or, optionally, the transmitter 110 aggregates the received data indicative of the unique identifiers associated with assets 106 and 306a, combines the received identifier data with data representative of the geolocation of asset 102. The transceiver 110 then transmits a second signal 108 to the back-end system 130 that includes at least the data representative of the geolocation of mobile device 102 and the data indicative of the received unique identifiers of assets 106 and 306a. The back end system 130 is able to determine the location of asset 306a falls within the geographic area 112 formed by the radius of the reception range of receiver 109.

FIG. 3B depicts two mobile devices 102a and 102b positioned at geolocations 104a and 104b, respectively. Mobile device 102a carries asset 106a and mobile device 102b carries asset 106b. The reception range 112a of receiver 109a carried by mobile device 102a and the reception range 112b of receiver 109b carried by mobile device 102b overlap in area 212. Asset 306a is not carried by a mobile device 102 and is located within the detection radius 112a of receiver 109a but not within the detection radius 112b of receiver 109b. Asset 306c is not carried by a mobile device 102 and is located within the detection radius 112b of receiver 109b but not within the detection radius 112a of receiver 109a. Asset 306b is not carried by a mobile device 102 and is located within the detection radius 112a of receiver 109a and within the detection radius 112b of receiver 109b.

Receiver 109a will receive first signals 107a broadcast by the short range transponder 105a carried by asset 106a; 307a broadcast by the short range transponder 305a carried by asset 306a; and 307b broadcast by the short range transponder 305b carried by asset 306b. Transmitter 110a will transmit a second signal 108a to one or more back-end systems 130 that includes at least data representative of the geolocation of mobile device 102a and data indicative of the unique identifiers associated with short range transponders 105a, 305a, and 305b.

Receiver 109b will receive first signals 107b broadcast by the short range transponder 105b carried by asset 106b; 307b broadcast by the short range transponder 305b carried by asset 306b; and 307c broadcast by the short range transponder 305c carried by asset 306c. Transmitter 110b will transmit a second signal 108b to one or more back-end systems 130 that includes at least data indicative of the geolocation of mobile device 102b and data indicative of the unique identifiers associated with short range transponders 105b, 305b, and 305c.

Since the one or more back-end systems 130 receive second signals 108a and 108b containing the unique identifier associated with transponder 305b from both transmitter 110a and transmitter 110b, the back-end system 130 can determine asset 306b lies within the area defined by the intersection 212 of the reception range/radii 112a and 112b of receivers 109a and 109b, respectively. Similarly, since the one or more back-end systems 130 receives second signal 108a containing the unique identifier associated with transponder 305a from only transceiver 110a, the back-end system 130 can determine the physical location of asset 306a falls inside of the radius 112a of receiver 109a but outside of the area defined by the intersection 212 of the reception range or radii 112a and 112b of the two transceivers 105a and 105b, respectively. Additionally, since the one or more back-end systems 130 receives second signal 108b containing the unique identifier associated with transponder 305c from only transmitter 110b, the back-end system 130 can determine the physical location of asset 306c falls inside of the radius 112b of receiver 109b but outside of the area defined by the intersection 212 of the reception range/radii 112a and 112b of the two receivers 109a and 109b, respectively.

FIG. 3C depicts four mobile devices 102a, 102b, 102c, and 102d positioned at geolocations 104a, 104b, 104c, and 104d, respectively. Mobile device 102a carries asset 106a; mobile device 102b carries asset 106b; mobile device 102c carries asset 106c; and mobile device 102d carries asset 106d. The reception ranges/radii 112a and 112d of receivers 109a and 109d define an area of intersection 220. The reception ranges/radii 112a, 112b, 112c, and 112d of receivers 109a, 109b, 109c, and 109d, respectively, define an area of intersection 230.

Asset 306a is not carried by a mobile device 102 and is located in the area of intersection 230 of reception ranges/radii 112a, 112b, 112c, and 112d of receivers 109a, 109b, 109c, and 109d, respectively. Consequently, each of transmitters 110a, 110b, 110c, and 110d generates and transmits a respective second signal 108a, 108b, 108c, and 108d to one or more back-end systems 130 that includes at least data representative of the geolocation 104a, 104b, 104c, and 104d of respective mobile devices 102a, 102b, 102c, and 102d as well as data indicative of the unique identifier assigned to transponder 305a carried by asset 306a. Since the one or more back-end systems 130 receive the unique identifier associated with transponder 305a from each of transmitters 110a, 110b, 110c, and 110d, the one or more back-end systems 130 can determine asset 306a lies within the area defining the intersection 230 of the respective reception ranges/radii 112a, 112b, 112c, and 112d of receivers 109a, 109b, 109c, and 109d.

Asset 306b is not carried by a mobile device 102 and is located in the area of intersection 220 of reception ranges/radii 112a and 112d of receivers 109a and 109d, respectively. Consequently, each of transmitters 110a and 110d generates and transmit a respective second signal 108a and 108d to one or more back-end systems 130 that includes at least data representative of the geolocation 104a and 104d of respective mobile devices 102a and 102d as well as data indicative of the unique identifier assigned to transponder 305b carried by asset 306b. Since the one or more back-end systems 130 receives the unique identifier associated with transponder 305b from each of transmitters 110a and 110d, the one or more back-end systems 130 can determine asset 306b lies within the area defined by the intersection 220 of the respective reception ranges/radii 112a and 112d of receivers 109a and 109d.

Figure 4:
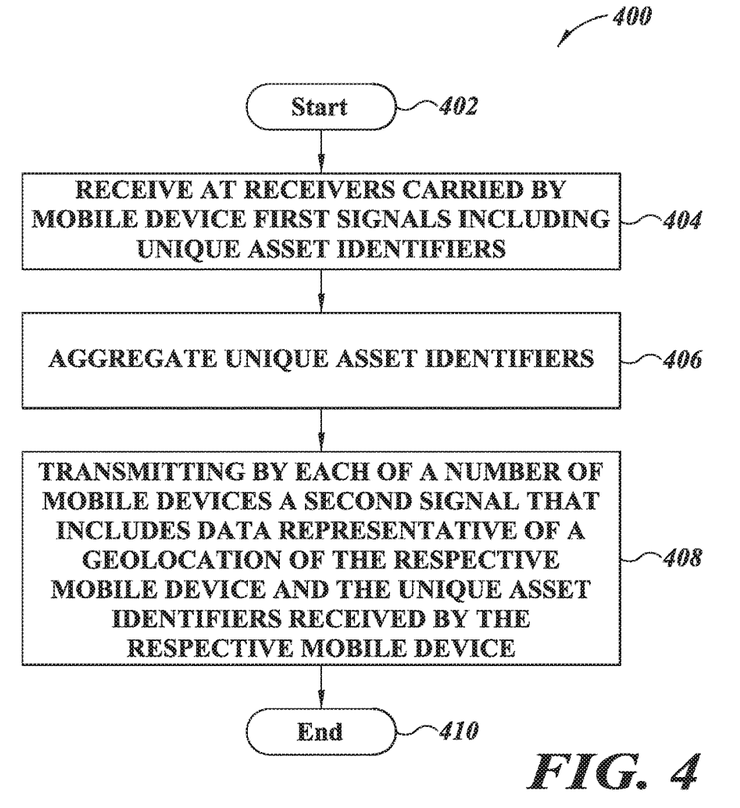
FIG. 4 is a high level flow diagram of an illustrative asset tracking method that uses an ad-hoc mesh network of mobile devices to report data unique to nearby assets, according to an illustrated embodiment.

FIG. 4 shows a high level flow diagram 400 of an illustrative asset tracking method, according to an embodiment. At times, some or all of a number of mobile devices 102, such as a number of electrically powered scooters, carry assets 106, such as secondary portable electric energy storage devices. In some instances, the portable electric energy storage devices are freely exchangeable between some or all of the electrically powered scooters. Each of the assets 106 carries a short range transponder 105 that broadcasts a respective first signal 107 that includes data indicative of an identifier unique to the asset 106. Some or all of the mobile devices 102 includes a receiver 109 to receive the RF signals 107 broadcast by short range transponders 105 located within the reception range/radius 112 of the receiver. Some or all of the mobile devices 102 also include a transmitter 110 that transmits a second signal 108 to at least one back-end system 130. The second signal 108 includes data representative of the geolocation of the mobile device 102 carrying the respective transmitter 110 as well as an aggregated list of unique asset identifiers received from short range transponders 105 carried by assets 106 located within the reception range/radius of the receiver 109 carried by the respective mobile device 102. The back end system 130 uses the geolocation information and unique identifiers to identify the locations of some or all of the assets 106. The asset tracking method 400 commences at 402.

At 404, each of a number receivers 109a-109n carried by a respective number of mobile devices 102a-109n receives a number of first signals broadcast by short range transponders 105a-105n carried by a respective number of assets 106a-106n. The first signal 107 broadcast by each of the short range transponders 105 includes data indicative of a unique identifier that uniquely identifies the particular transponder 105x that generated and broadcast the first signal 107x.

At 406, a controller 202 or transmitter 110 on each of at least some of the mobile devices 102 aggregates the unique identifiers received by the receiver 109 carried by the respective mobile device 102 at 404. The unique identifiers aggregated by the controller or transmitter 110 are indicative of the assets 106 that lay within the reception range/radius 112 of the receiver 109 carried by the respective mobile device 102.

At 408, the transmitter 110 on each of at least some of the mobile devices 102 generates a second signal 108, which includes data representative of the geolocation of the respective mobile device 102 and data indicative of the aggregated unique identifiers included in the first signals 107 received by the receiver 109 on the respective mobile device 102. The second signal 108 is transmitted to one or more back-end systems 130 via one or more networks 120, for example by a GSM, CDMA, 3G, 4G, or LTE cellular network. The method concludes at 410.

Figure 5:
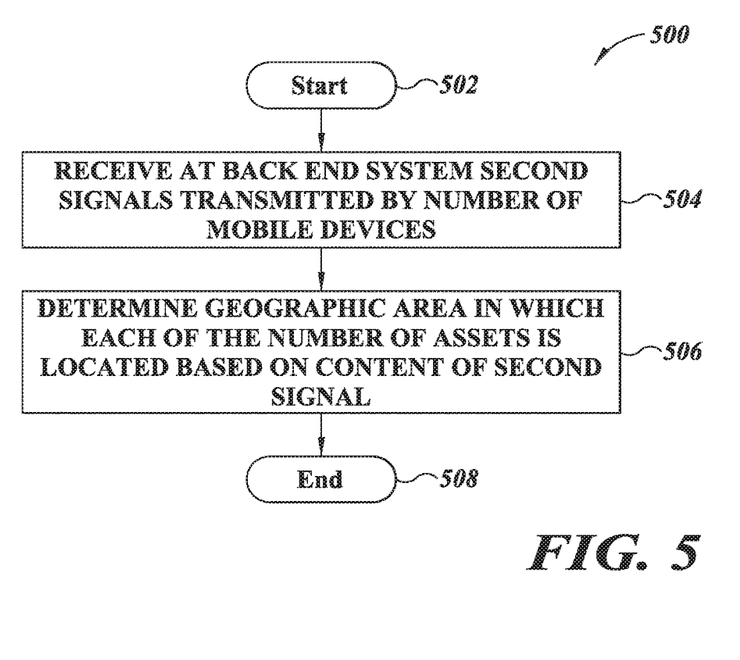
FIG. 5 is a high level flow diagram of an illustrative asset tracking method that uses a back end system to receive signals from ad-hoc mesh network of mobile devices that report data unique to nearby assets, according to an illustrated embodiment.

FIG. 5 shows a high level flow diagram 500 of an illustrative asset tracking method including a back-end system 130 determining the location of assets 106 using on information received in second signals 108 transmitted by a number of transmitters 110 carried by a respective number of mobile devices 102, according to an embodiment. The reception range/radius 112 of the receivers 109 carried by each of a number of mobile devices 102 is a defined value (e.g., 100 meters, 250 meters, 500 meters). Based on the geolocation of each mobile device 102; the range 112 of the receiver carried by each mobile device 102; and the unique identifiers for each asset 106, the back-end system 130 determines geographic areas in which each asset 106 is located. In the event more than one transmitter 110 transmits a second signal 108 including the same unique identifier, the location for the respective asset 106 can be determined with greater accuracy. The method 500 commences at 502.

At 504, the back-end system 130 receives the second signals 108 (e.g., the RF signals 108) transmitted by a number of transmitters 110. Each of the received RF signals 108 includes data indicative of the geolocation of the mobile device 102 carrying the transmitter 110 from which the respective RF signal 108 originated. Each of the received RF signals 108 also includes data indicative of the unique identifier associated with each of the first signals 107 (e.g., the RF broadcast signals 107) received by the receiver carried by the respective mobile device 102.

At 506, the back-end system 130 determines a geographic area containing each of the assets 106 associated with the received unique identifiers. The method 500 concludes at 508.

Figure 6:
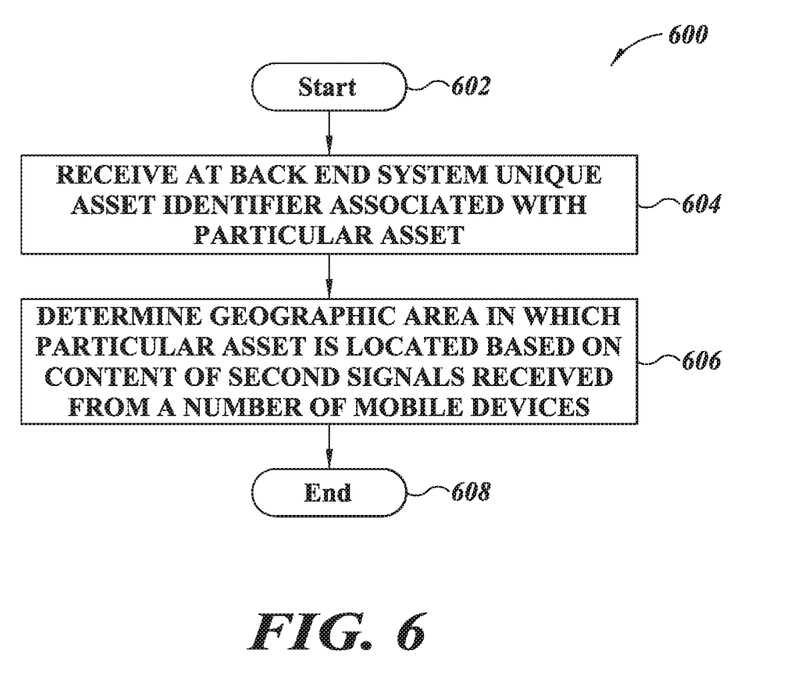
FIG. 6 is a high level flow diagram of an illustrative asset tracking method that uses a back end system to assist in locating assets dispersed throughout a geographic area, according to an illustrated embodiment.

FIG. 6 shows a high level flow diagram 600 of an illustrative asset locating method including a back-end system 130 receiving a user input that includes a unique asset identifier associated with a particular asset 106 and determining the location of the particular asset 106 using geolocation and unique identifiers included in the second signals 108 received by the back-end system 130 from a number of mobile devices 102, according to an embodiment. The back-end system 130 can be used to locate lost, stolen, or misplaced assets 106. Advantageously, since a large network of mobile devices 102 will travel throughout a geographic area, and since the short range transponder 105 on each asset will broadcast the first signal 107 regardless of whether the asset 106 is carried by a mobile device 102, detection of assets 106 using a network of mobile devices 102 is both rapid and effective regardless of the location of the asset 106. The method 600 commences at 602.

At 604, the back-end system 130 receives a user input that includes at least one unique identifier associated with a particular asset 106. The user input may be received locally at the back-end system 130 (e.g., via keyboard or similar input device) or remotely at the back end system 130 (e.g., transmitted as an electronic signal from a mobile or stationary client device to the back-end system host server).

At 606, the back-end system 130 determines a geographic area in which the particular asset 106 was last reported. At times, the back-end system 130 can determine the location of the particular asset 106 based on the most recently received geolocations 104 of mobile devices 102 transmitting second signals 108 that include the unique identifier associated with the particular asset 106. At other times, the back-end system 130 can poll some or all of the network of mobile devices 102 requesting those mobile devices 102 that received a first signal 107 that includes the unique identifier associated with the particular asset 106 to transmit a second signal 108 that includes the geolocation 104 of the respective mobile device 102 and the unique identifier associated with the particular asset 106. The method 600 concludes at 608.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012; U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. provisional patent application Ser. No. 61/511,887, entitled "THERMAL MANAGEMENT OF COMPONENTS IN ELECTRIC MOTOR DRIVE VEHICLES" and filed Jul. 26, 2011 and U.S. provisional patent application Ser. No. 61/511,880, entitled "DYNAMICALLY LIMITING VEHICLE OPERATION FOR BEST EFFORT ECONOMY" and filed Jul. 26, 2011; are incorporated herein by reference, in their entirety. Aspects of the embodiments can be modified, if necessary, to employ systems, circuits and concepts of the various patents, applications and publications to provide yet further embodiments.

While generally discussed in the environment and context of collection and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A back-end system, comprising:
a processor; and
a communications interface coupled to the processor;
wherein the processor is configured to:
determine a first detection range of a portable external device based on a first signal received via the communications interface;
determine a second detection range of an additional portable external device based on a second signal received via the communications interface; and
based on the first and second detection ranges, determine a geographic area in which a portable electrical energy storage device is located, wherein the geographic area is in an intersection of the first and second detection ranges, and wherein the portable electrical energy storage device includes a case and a wireless transponder inside the case, wherein the case directly encloses an energy storage cell of the portable electrical energy storage device such that the wireless transponder inside the case is not accessible by a user of the portable electrical energy storage device, wherein the portable electrical energy storage device is configured to move an electrically powered vehicle.

2. The system of claim 1, wherein the portable external device is a mobile computing device, and wherein the portable electrical energy storage device is a battery.

3. The system of claim 1, wherein the processor is configured to collect data from the portable electrical energy storage device.

4. The system of claim 1, wherein the processor is configured to transmit data to the portable electrical energy storage device.

5. A method comprising:
determining a first detection range of a portable external device based on a first signal received via a communications interface;
determining a second detection range of an additional portable external device based on a second signal received via the communications interface; and
based on the first and second detection ranges, determining a geographic area in which one or more portable electrical energy storage devices are located, wherein the geographic area is in an intersection of the first and second detection ranges, and wherein each of the one or more portable electrical energy storage device includes a case and a wireless transponder inside the case, wherein the case directly encloses an energy storage cell of the portable electrical energy storage device such that the wireless transponder inside the case is not accessible by a user of the portable electrical energy storage device, wherein the portable electrical energy storage device is configured to move an electrically powered vehicle.

6. The system of claim 1, wherein the portable external device includes a vehicle.

7. The system of claim 1, wherein the portable external device includes an electrically powered vehicle.

8. The system of claim 1, wherein the portable external device includes a scooter.

9. The system of claim 1, wherein the portable external device includes an electrically powered scooter.

10. The system of claim 1, wherein the one or more portable electrical energy storage devices include batteries.

11. The system of claim 1, wherein the one or more portable electrical energy storage devices include capacitors.

12. The system of claim 1, wherein the one or more portable electrical energy storage devices are for powering the portable external device.

13. The method of claim 5, wherein the portable external device includes a vehicle.

14. The method of claim 5, wherein the portable external device includes an electrically powered vehicle.

15. The method of claim 5, wherein the portable external device includes a scooter.

16. The method of claim 5, wherein the portable external device includes an electrically powered scooter.

17. The method of claim 5, wherein the one or more portable electrical energy storage devices include batteries.

18. The method of claim 5, wherein the one or more portable electrical energy storage devices include capacitors.

19. The method of claim 5, wherein the one or more portable electrical energy storage devices are for powering the portable external device.

20. The system of claim 1, wherein the wireless transponder is capable of communicating without an antenna external to the case.

21. The method of claim 5, wherein the wireless transponder is capable of communicating without an antenna external to the case. ed second signals.

* * * * *